United States Patent [19]

Ota et al.

[11] Patent Number: 4,811,198
[45] Date of Patent: Mar. 7, 1989

[54] ELECTRONIC THERMOMETER HAVING MEANS FOR PREDICTING A CONVERGED TEMPERATURE

[75] Inventors: Hiroyuki Ota, Takatsuki; Isao Kai, Kameoka, both of Japan

[73] Assignee: Omron Tateisi Electronics Co., Japan

[21] Appl. No.: 48,353

[22] Filed: Jul. 9, 1987

[51] Int. Cl.⁴ ............................................. G01K 7/00
[52] U.S. Cl. ................................... 374/169; 374/170; 364/557
[58] Field of Search ....................... 374/169, 170, 171; 364/557

[56] References Cited

U.S. PATENT DOCUMENTS

| | | | |
|---|---|---|---|
| 3,877,307 | 4/1975 | Georgi | 374/169 |
| 3,942,123 | 3/1976 | Georgi | 374/169 |
| 4,092,863 | 6/1978 | Turner | 374/169 |
| 4,541,734 | 9/1985 | Ishizaka | 374/169 |
| 4,574,359 | 3/1986 | Ishizaka et al. | 374/169 |
| 4,592,000 | 5/1986 | Ishizaka et al. | 364/557 |

Primary Examiner—William A. Cuchlinski, Jr.
Assistant Examiner—Patrick R. Scanlon
Attorney, Agent, or Firm—Wegner & Bretschneider

[57] ABSTRACT

An electronic thermometer includes temperature sensing member 11 for sensing a temperature on a predetermined sampling cycle to produce a measured value, predicted value computing member 10, ST13 for predicting a predicted value corresponding to a converged temperature in view of the measured value produced, by the sensing member, first judging member, 10, ST21 for judging that a predetermined drop of the measured value has continued for a predetermined time interval, alarming member for alarming in response to an output generated from the first judging member that the prediction by the predicted value computing member is not available, and display member for displaying the measured value or the predicted value.

2 Claims, 2 Drawing Sheets

ELECTRONIC THERMOMETER HAVING MEANS FOR PREDICTING A CONVERGED TEMPERATURE

BACKGROUND OF THE INVENTION

1. Field of the Invention

This invention relates to an electronic thermometer having means for prediciting a converged or steady temperature based on a measured temperature, and more particularly to an improved clinical thermometer including means for alarming that the predicting means is inoperable.

2. Discussion of the Prior Art

There is conventionally known an electronic clinical thermometer so designed that a body temperature is sensed by a temperature sensor, the sensed temperature is read by a processing unit, such as CPU or the like, on a predetermined sampling cycle to be displayed, while a converged temperature is predicted according to the sensed temperature to be displayed instead of the sensed temperature. After obtaining a predetermined volume off data about the sensed temperature, the converged temperature is subsequently renewed until completion of the measurement so as to improve the accuracy of the measurement, but when the sensed temperature suddenly drops, the predicting operation is judged to be impossible so that an indication of an operation error is displayed.

The judgement that the predicting operation is impossible is performed only when the degree of the drop of the temperature becomes larger than a predetermined value, for example, in the event that the temperature sensor is fairly out of measuring position. The conventional electronic thermometer in the event that the temperature sensor is slightly shifting from the measuring position, however, continues to compute out a converged temperature to be displayed by judging that the predicting operation is possible since the sensed temperature drops within a certain degree, so that the measurement is finished continuing erroneous prediction which results in a low reliability.

SUMMARY OF THE INVENTION

Against the above background, this invention has as its object to provide an electronic thermometer capable of determining inoperativeness of such predicting a converged temperature in case that a drop of the sensed temperature continues for a predetermined time interval other than the sensed temperature drops below a predetermined value.

In accordance with this invention, there is provided an electronic thermometer comprising temperature sensing means for sensing a temperature on a predetermined sampling cycle to produce a measured value, predicted value computing means for predicting a predicted value corresponding to a converged temperature in view of the measured value produced by the sensing means, first judging means for judging that a predetermined drop of the measured value has continued for a predetermined time interval, alarming means for alarming in response to an output generated from the first judging means that the prediction by the predicted value computing means is not available, and display means for displaying the measured value or the predicted value.

Other objects and advantages of this invention will be apparent to those skilled in the art from the following description of the preferred embodiment in conjunction with the appended drawings.

DETAILED DESCRIPTION

Figure 2:
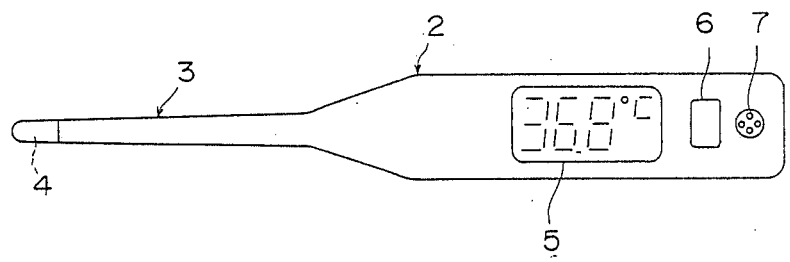
FIG. 2 is a front view of the electronic thermometer of the embodiment.

This invention as its preferred embodiment provides an electronic thermometer 1 as shown in FIG. 2 which is so designed to predict a converged temperature corresponding to a body temperature to be taken. The thermometer 1 as a single unit consists of a rectangular main body 2 and a probe 3 which is formed of a slender-rod-shape to have a temperature sensor 4 at its tip end. The main body 2 includes a display 5, a one-touch power switch 6 and a buzzer 7, and further a control circuit unit 8 therewithin.

Figure 3:
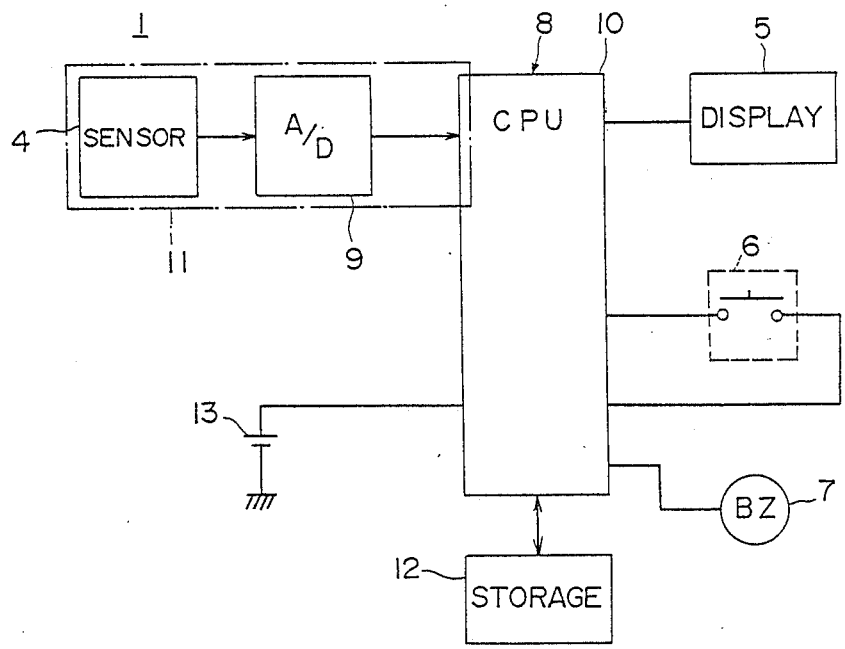
FIG. 3 is a schematic circuit block diagram of the thermometer.

As shown in FIG. 3, the control unit 8 is so constructed that a detection signal from a temperature sensor 4 is converted to a digital signal by an A/D converter 9 to be applied to CPU10. A temperature sensing means 11 is constructed by the CPU10 reading the detection signal representing an actually measured value on a predetermined sampling cycle, for example, every one second. The CPU10 further stores the measured value in a storage 12 and applies it to the display 5. Upon actuating the power switch 6, a switching signal is applied to the CPU10 so as to be supplied with a power from a source 13 and produce a buzzer signal for application to the buzzer 7.

The CPU10 is provided with a converged value computing means for computing a predicted value of a converged temperature according to measured values, a means for judging whether a measured value has dropped below a predetermined value, a means for judging whether a predetermined small drop of the measured value as continued for a predetermined time interval, and a means, in accordance with the judgement by the above means, for determining an inoperable state about prediction of the converged temperature so as to make a buzzing sound by the buzzer 7.

Figure 1:
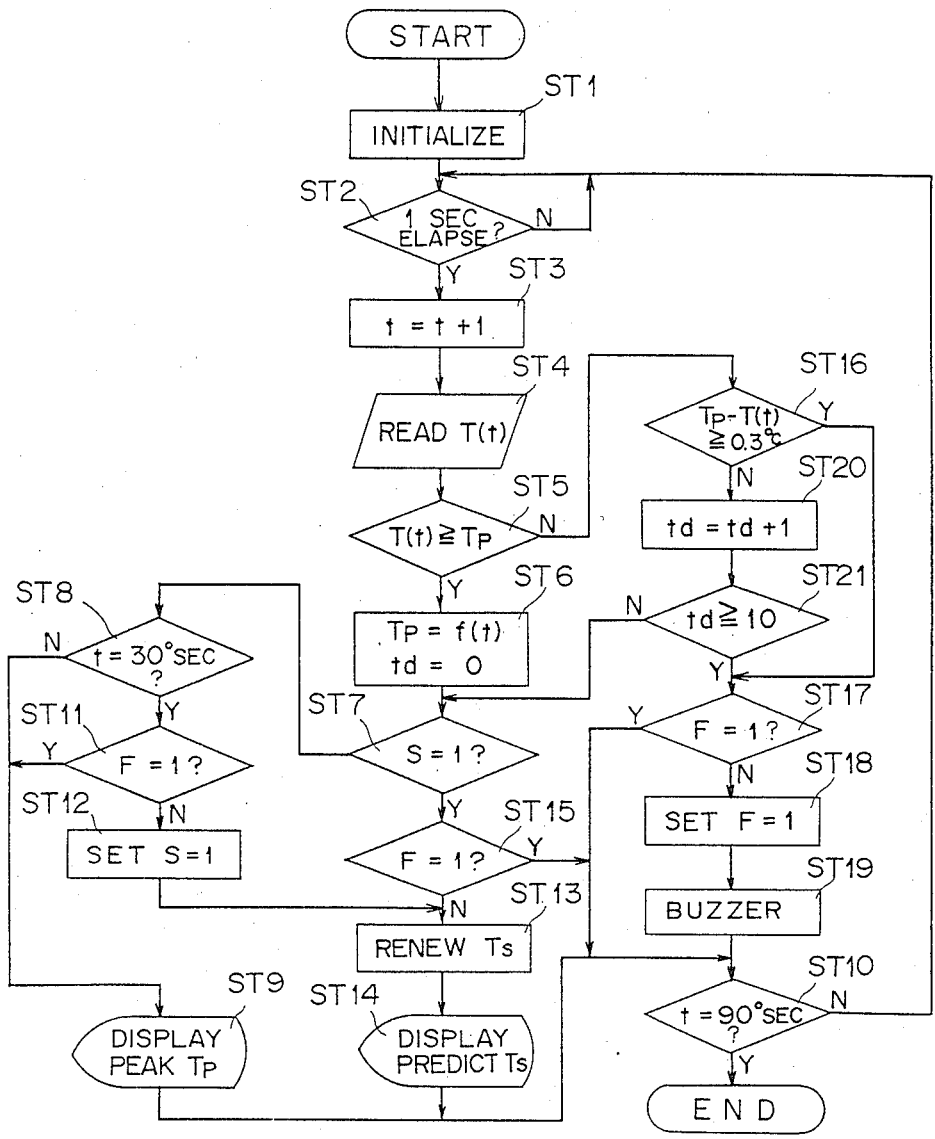
FIG. 1 is a control flow chart employed in an electronic thermometer as a preferred embodiment of this invention.

The construction and the operations of the electronic thermometer 1 will be explained hereinafter in accordance with a control flow chart as shown in FIG. 1.

Upon turning on the power switch 6, the thermometer 1 is initialized so as to set all flags to zero (step ST1) and whether one second has elapsed is inquired (step ST2), so that the following operations are performed every second to return to the step ST2. After elapse of one second, a timer "t" is added by a value "1" (step ST3), and temperature data, viz. measured values, T(t) are read (step ST4). Thus, a measured value T(t) produced in the temperature sensor 4 is read by the CPU10 on a one-second sampling cycle (temperature sensing means 11).

In a step ST5, an inquiry is made as to whether the measured value T(t) is larger than a peak value Tp, in other words, whether the peak value Tp representing the maximum value among the measured values T(t) after the initiation of the measurement should be renewed. The state that the measured value T(t) is larger than the peak value Tp shows a normal measuring operation and allows the following normal measuring operations to be executed (ST6 through ST15); The sequence moves from step ST5 to step ST6 wherein the peak value Tp is renewed and a down-timer "td" described later is reset to "0". In step ST7 whether a prediction is processed or whether a prediction flag S is set to "1" is inquired. In an initial measuring stage, the prediction flag S is set to "0" and a "No" response is applied to step ST8 where the lapse of 30 seconds in a measuring time "t" is inquired. Until the measuring time "t" reaches 30 seconds, the sequence flows to step ST9 wherein the peak value Tp is displayed on the display 5, and further to step ST10 wherein the completion of the measurement or the lapse of 900 seconds in the measuring time "t" is inquired. Unless the measuring time "t" reaches 900 seconds, the sequence returns to step ST2.

After the lapse of 30 seconds from the start of the measurement, a "Yes" response is applied from step ST8 to step ST11 wherein whether prediction is available or whether non-prediction flag is set to "1" is inquired. In normal measuring operations the non-prediction flag is set to "0" and the sequence moves to step ST12 where prediction flag S is set to "1". In step ST13 (predicted value computing means) a predicted value Ts for a converged temperature is computed. Then, the predicted value Ts is displayed by the display 5 (step ST14) and the sequence returns to step ST2 through step ST10. In the subsequent sampling time the prediction flag S is set to "1", so that a "Yes" response is applied from step ST7 to step ST15 where an inquiry is made as to whether prediction is available, viz. whether non-prediction flag F is set to "1". In a normal state where the flag F=0, the sequence flows from step ST15 to step ST13 in which a predicted valuee Ts is produced to be displayed on the display 5 (step St14), and returns to step ST2 through step St10. Thus, the predicted value Ts is renewed to be displayed until the measuring time t reaches 900 seconds or the power switch 6 is turned off, viz. a "Yes" response is produced in step St10 to complete the measuring operation.

If an improper operation is taken during the measuring, e.g. the probe 3 shifts from a measuring position, the measured value T(t) drops and a "No" response is generated in step ST5 for application to step ST16. In step St16, the difference between the measured value T(t) and the peak value Tp is examined as to whether or not it is equal to or larger than 0.3° C. in order to determine if the prediction is available. The determination is made in two occasions.

The first occasion is the case that the difference between T(t) and Tp becomes a predetermined value, 0.3° C. or larger, due to a rapid drop of the measured value T(t) (first judging means). In this occasion, the sequences flows from step St16 to step St17 where an inquiry is made as to whether the non-prediction flag F is set to "1". If the flag F has been set to "0", it is set to "1" to actuate the buzzer 7 (steps St18 and ST19). Then, the sequence returns from step ST19 to step ST2 through step ST10.

The second occasion is the case that the measured value T(t) drops below the peak Tp (a "No" response in step ST5) but the difference is below 0.3° C. in step ST16, so that a "NO" response is applied from step ST16 to step ST20 where the down timer "td" is counted by "1". In step ST21 an inquiry is made as to whether the elapsed time by the down timer "td" becomes 10 seconds or longer (second judging means), and, if 10 seconds elapse, the prediction is judged as impossible and the sequence flows from ST21 to ST17. In other words, if the measured value T(t) drops a little and such drop continues for more than 10 seconds, there is judged an erroneous measurement and the non-prediction flag F is set (step ST18). Until 10 seconds elapse in the drop of the measured value, a "No" response is applied from ST21 to ST7 and the above-mentioned normal measuring operations are made. If the measured value T(t) becomes larger than the peak value Tp in the period of 10 seconds, that is, the measured temperature rises again, a "Yes" response to step ST5 advances all operations to normal measuring state so that the down-timer td is reset.

If the non-prediction flag F is set to "1", a "Yes" response is made in step ST11 in the subsequent sampling time, so that the peak value Tp continues to be displayed in step ST9. In case that a prediction is developped, a "Yes" response is produced in step ST15 and applied to step ST10, so that any predicted value is not computed out. Once the non-prediction flag F is set, a "Yes" response to step ST17 flows to step ST10.

If a buzzing sound is made by buzzer 7, an operator may notice of an erroneous measuring operation, so that he can restart his measuring from the beginning.

Though the determination of inoperable state of prediction in this embodiment is based on the condition that the measured value T(t) decreases by more than 0.3° C., it may be modified to be based on other temperature degree. Moreover, the time interval during the time when a slight drop of the measured value continues may be other than 10 seconds, if desired. The alarming means is not restricted to buzzer 7, but may use a modification of the display 5 for showing an error mark. The electronic thermometer 1 may be separated into two units, main-body 2 and probe 3.

Thus, the electronic thermometer in accordance with this invention is so constructed that an inoperable state of prediction is informed to an operator when the measured value by the temperature sensing means rapidly drops more than a predetermined value or a predetermined drop of the value continues for a predetermined time interval, so that continuation of any erroneous prediction can be avoided in case that the sensor is not only fairly out of position but also slightly shifted from the measuring position and a great reliable measurement can be obtained. Any predicting operation stops whenever such an inoperable state of prediction is found whether it may be during a predicting operation or before.

The foregoing description should be taken merely as illustrative and not limited into any sense. state of prediction is found whether it may be during a predicting operation or before.

The foregoing description should be taken merely as illustrative and not limited into any sense.

What is claimed is:

1. An electronic thermometer comprising
temperature sensing means for sensing a temperature on a predetermined sampling cycle to produce a measured value,
predicted value computing means for predicting a predicted value corresponding to a converged temperature in view of said measured value produeed by said sensing means,
first judging means for judging whether a predetermined drop of said measured value has continued for a predetermined time interval, alarming means for alarming in response to an output generated from said first judging means that the prediction by said predicted value computing means is not available, and display means for displaying said measured value or said predicted value.

2. An electronic thermometer according to claim 1 further comprising second judging means for judging whether said measured value drops below a predetermined value, in which said alarming means is actuated by an output from said first or second judging means to alarm that the prediction is not available.

* * * * *